(12) United States Patent
Wimmer et al.

(10) Patent No.: US 10,532,694 B2
(45) Date of Patent: Jan. 14, 2020

(54) LIGHTING APPARATUS FOR AN INTERIOR TRIM PIECE OF A MOTOR VEHICLE

(71) Applicant: Lisa Draexlmaier GmbH, Vilsbiburg (DE)

(72) Inventors: Markus Wimmer, Mamming (DE); Alexandr Zaviyalov, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 15/951,017

(22) Filed: Apr. 11, 2018

(65) Prior Publication Data
US 2018/0297516 A1  Oct. 18, 2018

(30) Foreign Application Priority Data

Apr. 12, 2017 (DE) .......................... 10 2017 107 969

(51) Int. Cl.
| | |
|---|---|
| *G02B 6/34* | (2006.01) |
| *B60Q 3/54* | (2017.01) |
| *B60Q 3/78* | (2017.01) |
| *B60Q 3/66* | (2017.01) |
| *F21V 8/00* | (2006.01) |

(52) U.S. Cl.
CPC ................. *B60Q 3/54* (2017.02); *B60Q 3/66* (2017.02); *B60Q 3/78* (2017.02); *G02B 6/002* (2013.01); *G02B 6/0073* (2013.01)

(58) Field of Classification Search
CPC ... B60Q 3/54; B60Q 3/62; B60Q 3/64; B60Q 3/66; B60Q 3/78; G02B 6/0035; G02B 6/0036; G02B 6/0058; G02B 6/0061

USPC ...................................... 362/615; 340/815.45
See application file for complete search history.

(56) References Cited

U.S. PATENT DOCUMENTS

| | | | |
|---|---|---|---|
| 5,775,792 A * | 7/1998 | Wiese ....................... | F21V 5/02 |
| | | | 362/328 |
| 2006/0039670 A1* | 2/2006 | Feng .................... | G02B 6/0016 |
| | | | 385/146 |
| 2014/0063847 A1* | 3/2014 | Sakamoto ............ | G02B 6/0031 |
| | | | 362/609 |

(Continued)

FOREIGN PATENT DOCUMENTS

| | | |
|---|---|---|
| DE | 199 10 273 A1 | 9/2000 |
| DE | 10 2013 200 441 B3 | 5/2014 |

(Continued)

*Primary Examiner* — Sean P Gramling
*Assistant Examiner* — Keith G. Delahoussaye
(74) *Attorney, Agent, or Firm* — Jacob Eisenberg

(57) ABSTRACT

A lighting apparatus may be provided for an interior trim piece of a motor vehicle. The lighting apparatus comprises a light guide strip, comprising at least one light-entry face and a light-exit face, which each extend along a longitudinal direction of the light guide strip, and at least two end sides, lying opposite one another and respectively adjoining the light-entry face or light-exit face. A plurality of point light sources are arranged at the light-entry face. Moreover, the light sources are arranged at an unchanging light source spacing from one another. Here, a boundary spacing between a respective end side and a light source arranged closest to the respective end side corresponds to at most half the light source spacing. Moreover, the light guide strip has, at least in portions, a boundary structuring for at least partial output coupling of light at the end sides.

20 Claims, 3 Drawing Sheets

(56) References Cited

U.S. PATENT DOCUMENTS

2015/0078025 A1   3/2015   Kleiner

FOREIGN PATENT DOCUMENTS

| DE | 10 2013 213 523 A1 | 1/2015 |
| DE | 10 2013 218 739 A1 | 3/2015 |
| DE | 20 2013 105 727 U1 | 4/2015 |
| DE | 10 2015 222 505 A1 | 5/2017 |
| EP |      2 196 725 A1 | 6/2010 |

\* cited by examiner

LIGHTING APPARATUS FOR AN INTERIOR TRIM PIECE OF A MOTOR VEHICLE

CROSS REFERENCE TO RELATED APPLICATIONS

This application is based upon and claims the benefit of German Patent Application No. DE 10 2017 107 969.6, filed on Apr. 12, 2017, the entire contents of which is incorporated herein by reference.

TECHNICAL FIELD

The present disclosure relates to a lighting apparatus for an interior trim piece of a motor vehicle which, in particular, is suitable for producing a homogenous line lighting and/or moving light lighting in or on interior trim pieces of motor vehicles.

BACKGROUND

The integration of lighting areas in interior trim pieces of motor vehicles currently finds ever increasing use. A line lighting, i.e. the formation of a light line, such as a homogenous line of light, which extends over one or more interior trim pieces, in particular, is of particular interest.

For example, German Patent Document DE 10 2013 200 441 B3 describes a motor vehicle lighting device having a light guide, into which light can be fed by way of a light source. The light guide has a light-exit face which extends along a principal direction. Moreover, the light guide has a deflection face from which light that is incident by way of total-internal reflection is reflected toward the exit face.

German Patent Document DE 10 2013 213 523 A1 discloses a diffusing screen with a receiving portion for a line-shaped light guide, an emission portion extending parallel to the receiving portion for emitting light from the diffusing screen, and a connecting portion which connects the receiving portion with the emission portion. The diffusing screen consists of a transparent material such that light emitted by the line-shaped line guide can be received by the receiving portion and guided in the direction of the emission portion. In the emission portion, the light can leave the diffusing screen and radiate into the interior of the vehicle.

However, a problem regularly arising in the related art is that light inhomogeneity occurs at the boundary regions of the line lighting, i.e. at opposing longitudinal ends of the light line. This may be due, for example, to the fact that light from the light sources is reflected at the end sides of the light guide, which forms the light line, and consequently is superposed on the visible light guide side. Since this light superposition only occurs in the regions of the end sides and, as a rule, it does not occur over the remaining length of the light guide, an inhomogeneity may consequently occur in the light image.

SUMMARY

Embodiments of the present disclosure may provide a lighting apparatus for an interior trim piece of a motor vehicle. Embodiments of the present disclosure may address disadvantages arising in the prior art and may produce a homogeneous light image over the entire light guide length. Additional objects and advantages of the disclosed embodiments will be set forth in part in the following description and in the figures, and in part will be apparent from the description, or may be learned by practice of the embodiments.

Objects and advantages of the disclosed embodiments may be realized and attained by the elements and combinations set forth in the claims. However, embodiments of the present disclosure are not necessarily required to achieve such exemplary objects and advantages, and some embodiments may not achieve any of the stated objects and advantages.

Embodiments of the present disclosure may provide a lighting apparatus for an interior trim piece of a motor vehicle that comprises a light guide strip, the light guide strip comprising at least one light-entry face and at least one light-exit face. In some embodiments, the light guide strip may have a quadrilateral, in particular rectangular cross section, wherein the light-entry face and the light-exit face may lie opposite one another and may be formed by shorter sides of the rectangular or quadrilateral shape of the cross section. The light-entry face and the light-exit face may extend along a longitudinal direction of the light guide strip. For example, the longitudinal direction can be understood to be the longest side of the light guide strip. Thus, with their longest sides, the light-entry face and the light-exit face extend parallel to the longitudinal direction of the light guide strip. Moreover, the light guide strip may comprise at least two end sides, which are arranged opposite one another and respectively adjoin the light-entry face and the light-exit face. The end sides may extend at right angles to the light-entry and light-exit faces. Furthermore, in some embodiments, the end sides may respectively form the ends of the light guide strip. Moreover, the light guide strip may consist of a transparent polymer, such as polycarbonate (PC) or polymethyl methacrylate (PMMA).

A plurality of point light sources may be arranged in a row along the light-entry face. The light sources are preferably aligned with respect to the light-entry face in such a way that light emitted by the light sources is able to radiate onto the light-entry face. Here, the row may extend parallel to the longitudinal direction of the light guide strip. The point light sources may be embodied by single color and/or multicolor light-emitting diodes. The light sources may be arranged at a predetermined spacing from one another. For example, the light sources may be spaced at an unchanging interval. This can be understood to mean that the distances between two adjacent light sources are constant. Moreover, a boundary spacing may be provided, the boundary spacing being from the light sources arranged closest to a respective end side and the respective end side. In some embodiments, the boundary spacing may correspond to, for example, at most half the light source spacing. The boundary spacing may thus also be less than, but not greater than half the light source spacing. The boundary spacings of the two end sides to the light sources respectively arranged closest thereto may be of equal size.

Moreover, the light guide side may have, at least in portions, a boundary structuring configured to output couple light at the end sides. Boundary structuring can be understood to mean, for example, a surface condition which may have both a regular and irregular embodiment and which comprises elevations and/or depressions and which thereby improves the light output coupling of light guided in the light guide. The boundary structuring may be configured to achieve at least partial output coupling of light at the end sides.

Arranging the light sources at the same light source spacing while taking account of the relationship between boundary spacing and light source spacing renders it possible to ensure that a homogeneous light image forms over the entire length of the light guide strip. At the same time, it is possible to prevent unwanted light superpositions at the light-exit face from occurring in the boundary regions, i.e. in the regions of the end sides of the light strip guide, which could lead to light inhomogeneity. Some of the light that passes through the light guide strip and strikes the end sides may be output coupled by the additional boundary structuring. Although this light can no longer be readily perceived by the vehicle occupants, there consequently is a minimization of reflections in the direction of the light-exit face which could lead to superpositions and consequently to light inhomogeneity. As a result of the additional arrangement of the light sources that takes account of the light source spacing and the boundary spacing, it is possible to at least reduce the superpositions to such an extent that an observer perceives the light emerging from the light-exit face as homogeneous.

It was found that a particularly homogeneous light image can be produced on the light-exit face if the light source spacing corresponds to 0.7 to 1.3 times the distance from the light-entry face to the light-exit face. Within this range and taking account of the relationship of boundary spacing and light source spacing, superpositions of light beams in the region of the end sides at the light-exit face can be at least minimized to the extent that a homogeneous light image is realizable over the entire light guide length, at least at the light-exit face.

In some embodiments, the distance between light-entry face and light-exit face may be measured along an extending path of the light guide strip between light-entry face and light-exit face. By way of example, if the light guide strip curves between light-entry face and light-exit face, the distance between the light-entry face and the light-exit face may be determined not by the shortest distance between the two faces, but by the distance that follows the curvature of the light guide.

Moreover, it was found to be advantageous to produce the boundary structuring from a plurality of prisms that are arranged in at least one row. A prism can be characterized in that it has an n-gon base formed in a two-dimensional plane, which forms a three-dimensional body by way of a parallel displacement in a third spatial direction. Here, the base of the prism or the prisms may be arranged parallel to a side that connects the light-entry face and the light-exit face to one another.

A base may be formed in substantially a triangular shape. For example, it was found to be advantageous if the prisms have a triangular base (e.g. when observed in a front view of the lighting apparatus). Since the prisms may be arranged in at least one row, a type of sawtooth structure may consequently be formed at the end side. An advantage of using a triangular base may be that it becomes possible to set the output coupling behavior along the end sides by way of angle adjustments of the interior angles of the triangles. At the same time, such a boundary structuring can be produced in a simple manner and it can easily be removed from a molding tool. For example, the light guide strip may be produced by way of injection molding.

Reference is made here to the fact that the boundary structurings of the two end sides need not necessarily be identical to one another. It is likewise possible for the boundary structurings to differ from one another in terms of their form.

Furthermore, the triangular shape of base forming the prism may have a corner which adjoins the end face and faces the light-exit face and also has an interior angle $\alpha$ of between 30 and 130°. Control of the output coupling behavior of the light guide strip at the end side can be enhanced by way of the angle at this corner.

Reference is made to the fact that the prisms may also be arranged next to one another in a plurality of parallel rows. In this case, the prisms may be arranged both parallel to one another and also offset from one another.

It was found that a side edge of the base of the prism adjoining the corner preferably extends parallel to the light-exit face. In the case of such an alignment, it is possible to create an additional output coupling face, at which the light is output coupled into a region that should not be perceivable by the observer, and so light does not remain in the light guide and consequently also cannot lead to unwanted reflections and unwanted superpositions connected therewith.

It was furthermore found to be advantageous for the prisms to be arranged at uniform defined distances from one another. This may ensure that light that is guided in the light guide strip and that strikes one of the end sides is uniformly output coupled from the light guide strip, preventing additional inhomogeneity in the boundary regions of the light guide strip.

Depending on the employed light source, the light cone that is formed by the light source and that can continue even after the light has been input coupled into the light guide strip can irradiate the end sides to a different extent. Furthermore, the light of the light source can scatter within the light guide strip. Therefore, it may be possible for significantly more light to strike the boundary structuring in a first region of the boundary structurings than in a second region of the boundary structuring. By way of example, this may be compensated for by virtue of the prisms differing from one another in terms of their size and form. Thus, it is possible, for example, to use larger prisms or prisms with particularly expedient output coupling form in regions in which more light should be output coupled than in other regions of the end side.

It was furthermore found to be advantageous if at least one end side adjoins, or is arranged at, a cover element, in particular a light-absorbing cover element. This continues to ensure that the light that is output coupled from the light guide strip by way of the boundary structuring radiates into the cover element and consequently can no longer be perceived by the observer. The cover element may be light absorbing such that, for example in some embodiments, no light reflections occur between the light guide strip and cover element.

Here, the cover element can have a surface structure which, at least in part, corresponds to a negative of the boundary structuring. The boundary structuring may engage at least in part with the surface structure. Thus, the boundary structuring may additionally fasten the light guide strip. At the same time, this can efficiently ensure that the light radiated into the boundary structuring is completely received by the cover element and not reflected back into the light guide strip.

The light guide strip may comprise a light-guiding portion and light-scattering portion. In some embodiments, the boundary structuring may be arranged in the light-guiding portion. The light-guiding portion can serve to guide light that has been input coupled into the light guide strip, with the light in the light-guiding portion not being scattered or only a very small part thereof being scattered. Advantageously, the light-guiding portion consists of a highly transparent material such as polycarbonate (PC), for example. By contrast, the light-scattering portion preferably consists of a relatively diffuse material that promotes the scattering of light. By way of example, the light-scattering portion may be realized using a polycarbonate that has light-scattering additives introduced therein. The light-guiding portion preferably adjoins the light-entry face and the two end sides, with the light-scattering portion preferably adjoining the light-exit face and the end sides. Furthermore, the light-scattering portion may adjoin the light-guiding portion.

It was further found to be advantageous if the light guide strip is curved from the light-entry face to the light-exit face. As a result of the curvature, the light guide strip can be integrated in the interior trim piece of the vehicle in a way that saves space. For example, a curved light guide strip may save significantly more space than a non-curved light guide strip.

Moreover, further advantages and features of the present disclosure will become clear from the following description of exemplary embodiments. The features described therein and above can be implemented on their own or in combination, provided the features do not contradict one another. Here, the following description of the exemplary embodiments is made with reference to the attached drawings.

BRIEF DESCRIPTION OF THE DRAWINGS

The above and other aspects of the present disclosure will become more apparent by describing exemplary embodiments in detail below with reference to the accompanying drawings, in which.

DETAILED DESCRIPTION

As used throughout the present disclosure, the expression "A and/or B" shall mean A alone, B alone, or A and B together. Expressions such as "at least one of" do not necessarily modify an entirety of a following list and do not necessarily modify each member of the list, such that "at least one of A, B, and C" should be understood as including only one of A, only one of B, only one of C, or any combination of A, B, and C.

The figures are merely schematic illustrations and only serve to explain the present disclosure. Identical elements or elements that have the same effect are provided all the way through with the same reference sign.

Figure 1:
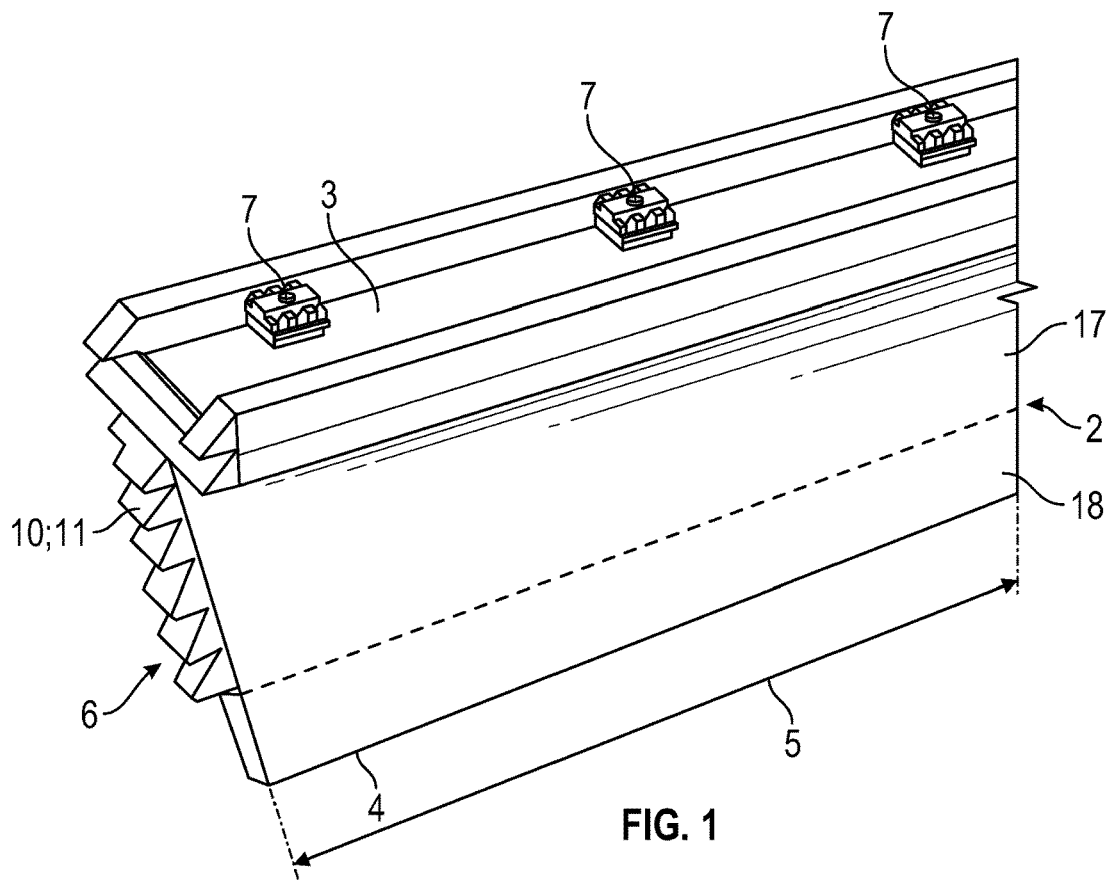
FIG. 1 shows a portion of a lighting apparatus according to an embodiment of the present disclosure in a perspective view.

FIG. 1 shows a portion of a lighting apparatus 1 according to the present disclosure in the region of an end side 6 of a light guide strip 2. In the present exemplary embodiment, the light guide strip 2 is formed from a two-component injection molded part. The light guide strip 2 comprises a light-guiding portion 17, which is made from a highly transparent polycarbonate, and a light-scattering portion 18, which is made from a diffuse polycarbonate, which had light scattering additives added thereto. The light guide strip 2 may be a substantially planar member. Point light sources 7 are arranged in a row along a light-entry face 3. In the present exemplary embodiment, the light sources 7 are formed by multicolored light-emitting diodes. The light sources 7 are arranged with an unchanging light source spacing 8 therebetween. Here, the light sources 7 or the row of light sources 7 extends parallel to a longitudinal direction 5 of the light guide strip 2. A boundary structuring 10 is arranged at the end side 6. In the present exemplary embodiment, the boundary structuring 10 only extends over a portion of the end side 6, said portion adjoining the light-guiding portion 17.

Figure 4:
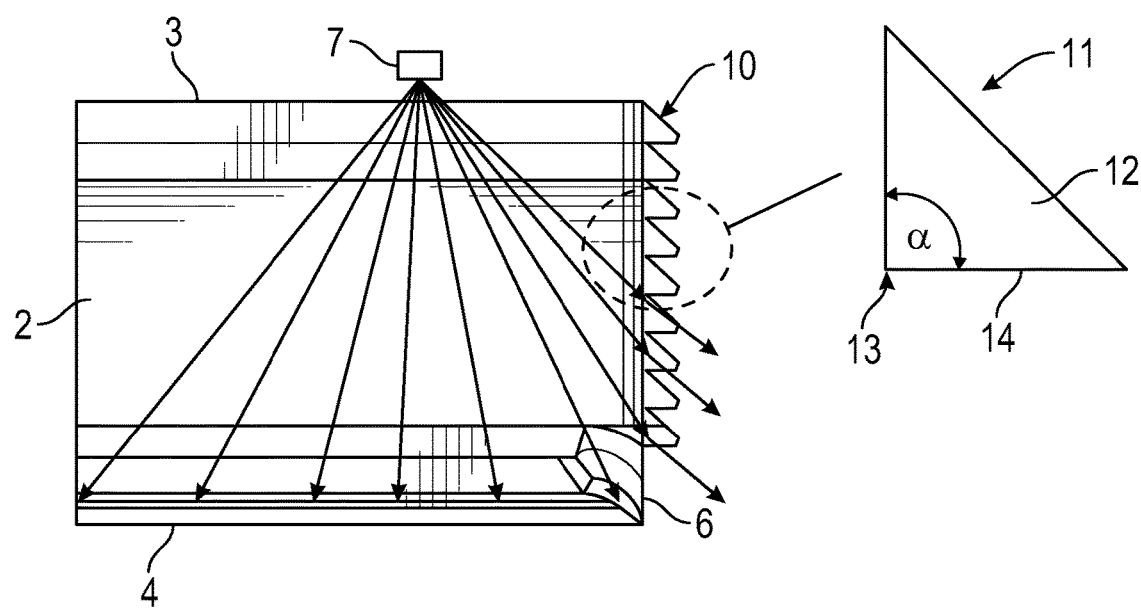
FIG. 4 shows a lighting apparatus according to an embodiment of the present disclosure in the region of an end side.

The boundary structuring 10 is formed by prisms 11 which have a triangular base 12. FIG. 4 shows the arrangement of prisms 11 with respect to longitudinal direction 5. Here, the prisms 11 may differ in terms of their size but are arranged at regular intervals in a first direction perpendicular to the longitudinal direction 5. Moreover, the prisms 11 may differ in terms of their thicknesses, i.e. they may extend to a different extent in a second direction perpendicular to the longitudinal direction 5, the second direction being perpendicular to the first direction. For example, the prism 11 arranged directly at the light-entry face 3 in FIG. 1 has a greater thickness than the other prisms 11 that are spaced further from the light-entry face 3. This means that while a prism 11 that extends over the entire width of the light-entry face 3 may be arranged in the region of the light-entry face 3, there exist further regions along the sides connecting the light-entry face 3 and the light-exit face 4 to one another in which the prisms 11 may be selected to be significantly narrower. The prisms 11 may be monolithic with the light guide strip 2. For example, the boundary structuring 10 was made fully formed from the mold with the light guide strip 2 in a process step not shown here. Thus, the prisms 11 are embodied with the light guide strip 2 of the light guiding section 17 from uniform material.

Figure 2:
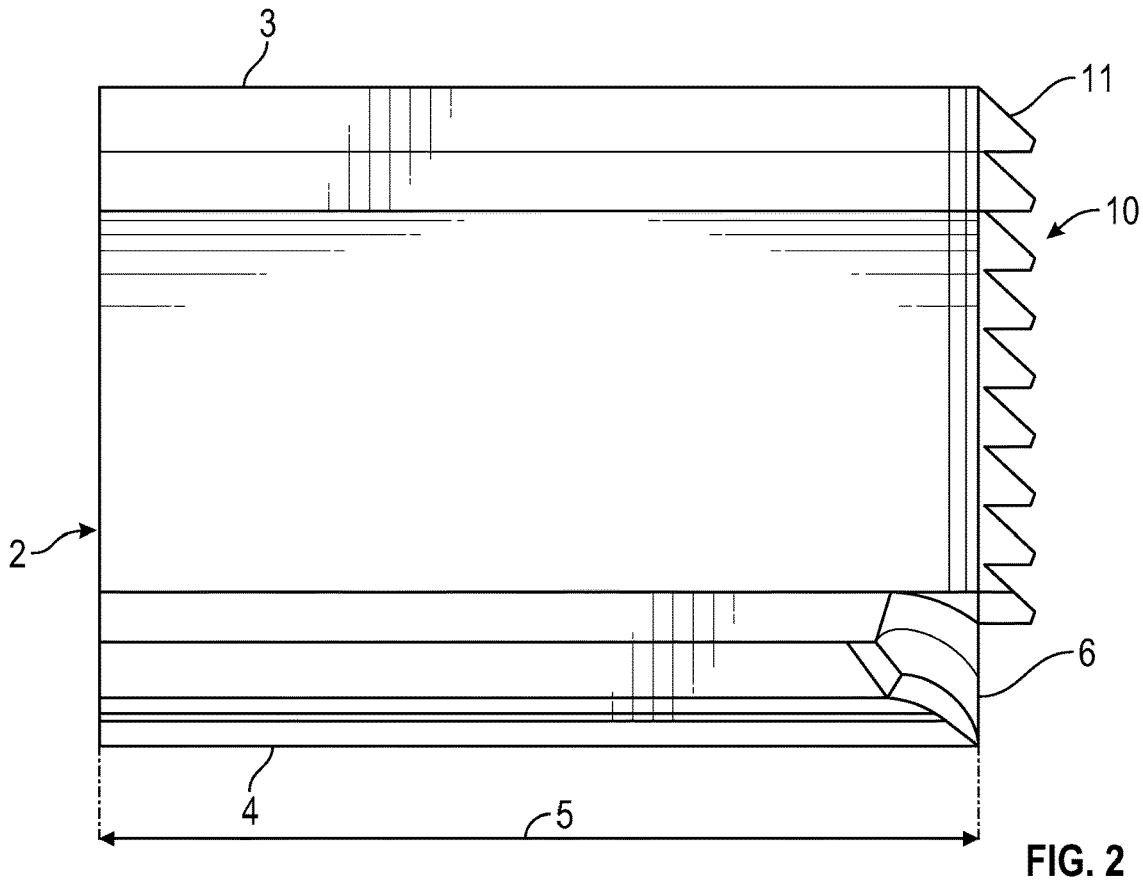
FIG. 2 shows a lighting apparatus according to FIG. 1 in an alternative view.

FIG. 2 shows an embodiment of a light guide strip 2 according to the present disclosure in the region of an end side 6. Differing from FIG. 1, the prisms 11, which form the boundary structuring 10, have an unchanging form and an unchanging size. However, in FIG. 2, the boundary structuring 10 does not extend over the entire area of the end side 6. The boundary structuring 10 may be provided over only a portion of the end side 6, for example, in order to ensure that there is no unwanted output coupling in the region of the light-exit face 4. In the present exemplary embodiment, the base 12 of the prisms 11 corresponds to a right-angled triangle.

Figure 3:
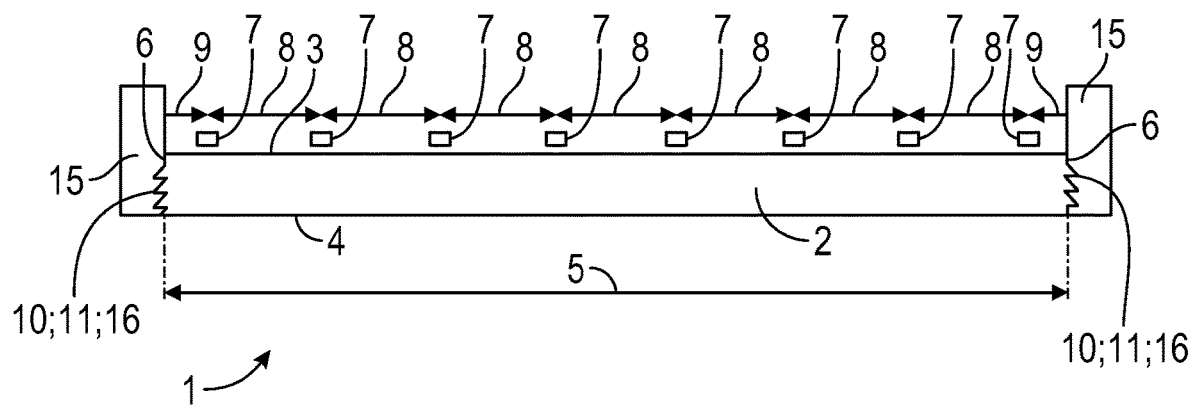
FIG. 3 shows a schematic view of a lighting apparatus according to an embodiment of the present disclosure.

FIG. 3 shows a schematic illustration of the lighting apparatus 1 according to the present disclosure, wherein the light guide strip 2 is arranged between two cover elements 15. The cover elements 15 consist of a light-opaque polypropylene and have a surface structure 16 that is complementary to the boundary structuring 10, i.e. it corresponds to the negative of the boundary structuring 10 of the respective end side 6. Thus, the boundary structuring 10 of the end side 6 projects into the cover element 15 and forms a type of undercut there in the direction of the light-exit face 4. In this way, light which is coupled from the light sources 7 into the light guide strip 2 and which radiates in the direction of the boundary structuring 10 is output coupled from the light guide strip 2 at the boundary structuring 10 and absorbed by the cover element 15. Consequently, reflection of light back into the light guide strip 2 is suppressed. The light sources 7, which may be embodied as light-emitting diodes, are arranged with an unchanging light source spacing 8 therebetween. Here, the light sources 7 respectively arranged closest to the end side 6 have boundary spacing 9 from the end side 6. The two boundary spacings 9 of the respective end side 6 are the same in this context.

FIG. 4 shows a further embodiment of the lighting apparatus 1 according to the present disclosure in the region of an end side 6 of the light guide strip 2. Furthermore, the schematic beam path of a light emitted by a light source 7 is shown. The light propagates in a conical fashion from the point light source 7. Here, some of the light strikes the light-exit face 4 directly and consequently leaves the light guide strip 2. However, some of the light strikes the end side 6 and the boundary structuring 10 situated there. As a result of the boundary structuring 10, the light of the light source 7 is likewise output coupled at this point, even if it lies outside of the visual field for the observer. For example, light from the light source 7 may be output coupled as a result of absorption by the cover element 15. This continues to ensure that the light is not reflected back from the end side 6 in the direction of the light-exit face 4 and said light does not lead to unwanted superpositions. Furthermore, the base 12 of one of the prisms 11 of the boundary structuring 10 is illustrated schematically. In the present exemplary embodiment, the base 12 of the prism 11 forms a triangle which has an angle α of 90° at one corner 13. In this way, a side edge 14 which extends parallel to the light-exit face 4 is produced. Accordingly, the light of the light source 7 may be output coupled particularly effectively in the region of the end side 6. Furthermore, it is also possible for the angle to change depending on the distance of the prism 11 from the light source 7. In this way, it may be ensured that there always is ideal light output coupling in the region of the boundary structuring 10.

Figure 5:
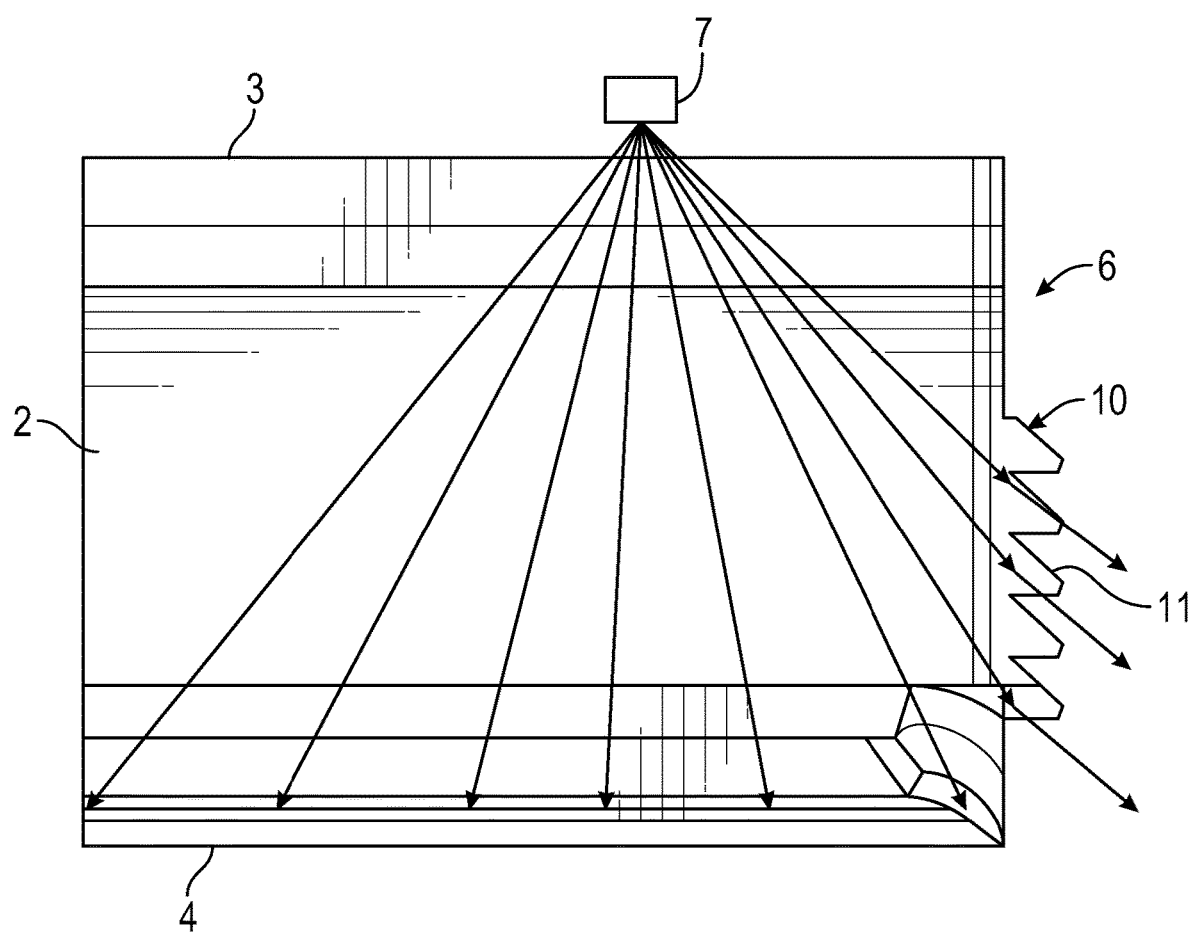
FIG. 5 shows a lighting apparatus according to an embodiment of the present disclosure in the region of an end side.

FIG. 5 shows an alternative embodiment of the lighting apparatus 1 according to the present disclosure in the region of an end side 6 of the light guide strip 2. Differing from FIG. 4, the boundary structuring 10 extends in a smaller region. This may be due to the light cone of the light source 7 having a narrower profile and consequently reflections are not expected in all regions of the end side 6. In this way, it is possible to efficiently optimize the geometry of the light guide strip 2 and consequently it is possible to reduce production costs of the light guide strip 2.

Having described aspects of the present disclosure in detail, it will be apparent that further modifications and variations are possible without departing from the scope of aspects of the present disclosure as defined in the appended claims. As various changes could be made in the above constructions without departing from the scope of aspects of the present disclosure, it is intended that all matter contained in the above description and shown in the accompanying drawings shall be interpreted as illustrative and not in a limiting sense.

LIST OF REFERENCE SIGNS

1 Lighting apparatus
2 Light guide strip
3 Light-entry face
4 Light-exit face
5 Longitudinal direction
6 End sides
7 Light sources
8 Light source spacing
9 Boundary spacing
10 Boundary structuring
11 Prism
12 Base
13 Corner
14 Side edge
15 Cover element
16 Surface structure
17 Light-guiding portion
18 Light-scattering portion

What is claimed is:

1. A lighting apparatus, comprising:
a light guide strip comprising a light-entry face and a light-exit face, that each extend in a longitudinal direction of the light guide strip, and comprising at least two opposing end sides, each respectively adjoining the light-entry face and the light-exit face,
a plurality of point light sources arranged in a row along the light-entry face,
wherein:
the light sources are arranged to have a uniform light source spacing between one another, the light source spacing corresponding to 0.7 to 1.3 times a distance from the light-entry face to the light-exit face,
a boundary spacing between at least one of the end sides and at least one of the light sources arranged closest to the at least one of the end sides corresponds to at most half the light source spacing,
the light guide strip has a boundary structuring configured to output light at the end sides, and
the light guide strip is curved from the light-entry face to the light-exit face.

2. A lighting apparatus, comprising:
a light guide strip comprising a light-entry face and a light-exit face, that each extend in a longitudinal direction of the light guide strip, and comprising at least two opposing end sides, each respectively adjoining the light-entry face and the light-exit face,
a plurality of point light sources arranged in a row along the light-entry face, and
a cover element arranged on at least one of the end sides, wherein the length of the cover element is less than the length of the light-entry face,
wherein:
the light sources are arranged to have a uniform light source spacing between one another, the light source spacing corresponding to 0.7 to 1.3 times a distance from the light-entry face to the light-exit face,
a boundary spacing between the at least one of the end sides and at least one of the light sources arranged closest to the at least one of the end sides corresponds to at most half the light source spacing, and
the light guide strip has a boundary structuring configured to output light at the end sides.

3. The lighting apparatus according to claim 2, wherein the boundary structuring comprises a plurality of prisms that are arranged in at least one row along at least one of the end sides.

4. The lighting apparatus according to claim 3, wherein the prisms have a triangular base.

5. The lighting apparatus according to claim 4, wherein the base forms a triangle having a corner that adjoins at least one of the end sides and faces the light-exit face, the corner having an interior angle of between 30 and 130 degrees.

6. The lighting apparatus according to claim 5, wherein a side edge of the base adjoining the corner extends parallel to the light-exit face.

7. The lighting apparatus according to claim 3, wherein the prisms are arranged at uniform distances from one another.

8. The lighting apparatus according to claim 3, wherein the prisms differ from one another in at least one of form and size.

9. A lighting apparatus, comprising:
- a light guide strip comprising a light-entry face and a light-exit face, that each extend in a longitudinal direction of the light guide strip, and comprising at least two opposing end sides, each respectively adjoining the light-entry face and the light-exit face,
- a plurality of point light sources arranged in a row along the light-entry face, wherein:
- the light sources are arranged to have a uniform light source spacing between one another, the light source spacing corresponding to 0.7 to 1.3 times a distance from the light-entry face to the light-exit face,
- a boundary spacing between at least one of the end sides and at least one of the light sources arranged closest to the at least one of the end sides corresponds to at most half the light source spacing,
- the light guide strip has a boundary structuring configured to output light at the end sides,
- the boundary structuring comprises a plurality of prisms that are arranged in at least one row along at least one of the end sides,
- the prisms have a triangular base, and
- the base forms a triangle having a corner that adjoins at least one of the end sides and faces the light-exit face, the corner having an interior angle of between 30 and 130 degrees.

10. The lighting apparatus according to claim 9, further comprising a cover element arranged on at least one of the end sides.

11. The lighting apparatus according to claim 10, wherein the cover element is a light-absorbing cover element.

12. The lighting apparatus according to claim 10, wherein the cover element has a surface structure which, at least in part, corresponds to a negative of the boundary structuring, and the boundary structuring engages at least in part the surface structure.

13. The lighting apparatus according to claim 9, wherein the light guide strip comprises a light-guiding portion and a light-scattering portion, and wherein the boundary structuring is arranged in the light-guiding portion.

14. The lighting apparatus according to claim 13, wherein the boundary structuring is provided over only the light-guiding portion.

15. The lighting apparatus according to claim 9, wherein the light guide strip is curved from the light-entry face to the light-exit face.

16. The lighting apparatus according to claim 9, wherein the boundary structuring is provided over only a portion of the end side.

17. The lighting apparatus according to claim 9, wherein the boundary structuring extends over a width that is equal to a width of the light-entry face.

18. The lighting apparatus according to claim 9, wherein the boundary structuring is monolithic with the light guide strip.

19. The lighting apparatus according to claim 9, wherein the light guide strip is a planar member.

20. The lighting apparatus according to claim 9, wherein the light guide strip comprises a light-guiding portion and a light-scattering portion, and the light-scattering portion includes light scattering additives.

* * * * *